Patented Nov. 21, 1933

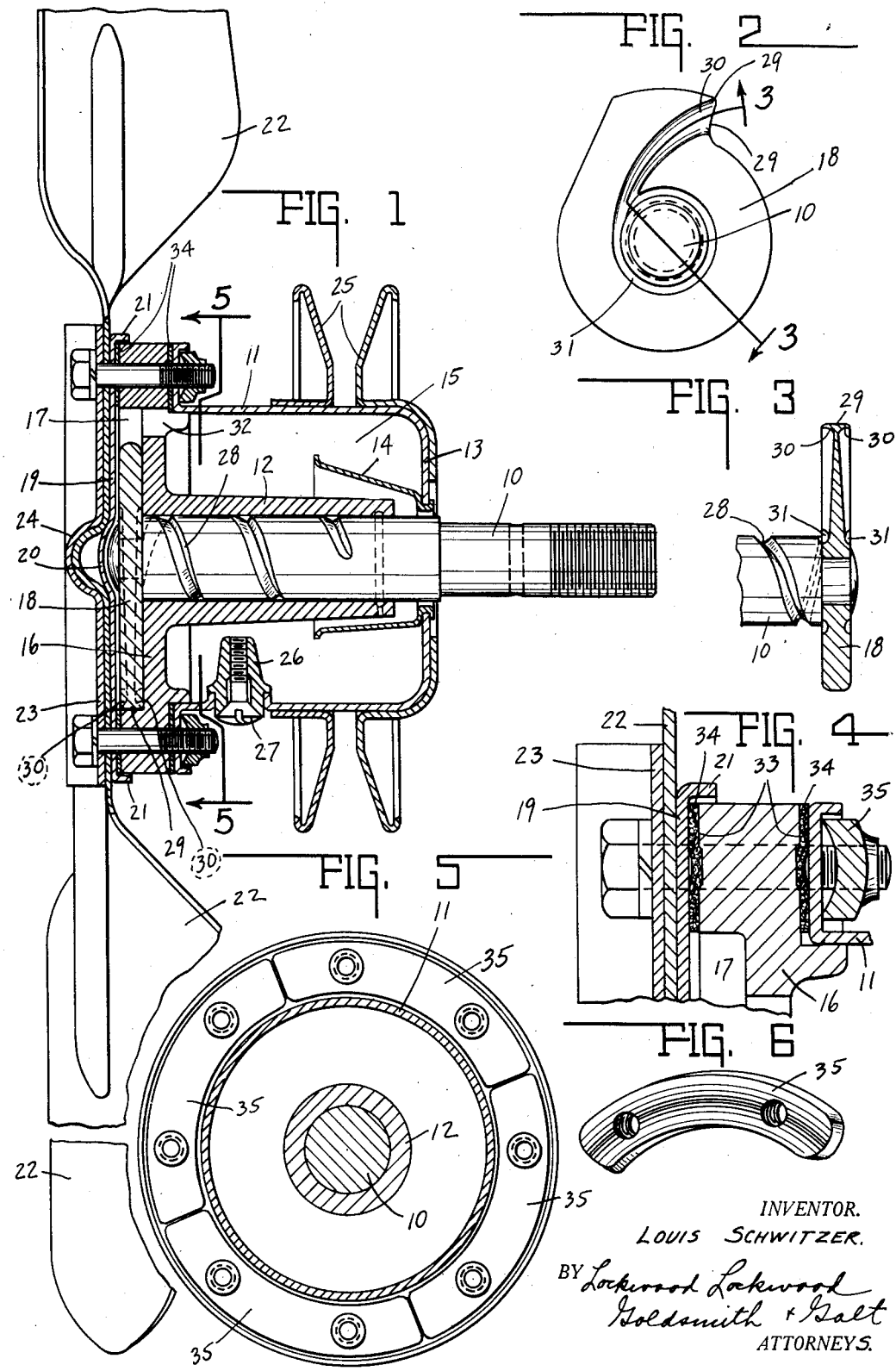
Nov. 21, 1933.  L. SCHWITZER  1,935,921
FAN CONSTRUCTION
Filed May 24, 1930
INVENTOR.
LOUIS SCHWITZER.
BY Lockwood Lockwood
Goldsmith & Galt
ATTORNEYS.

1,935,921

UNITED STATES PATENT OFFICE 1,935,921

FAN CONSTRUCTION

Louis Schwitzer, Indianapolis, Ind., assignor to Schwitzer-Cummins Company, Indianapolis, Ind., a corporation Application May 24, 1930. Serial No. 455,207

6 Claims. (Cl. 308—117)

This invention relates to the construction of a cooling fan for automobiles and the like, wherein the fan is rotated at a high rate of speed by a driving belt, chain or the like, about a stationary spindle.

In a fan of this type it is very important to eliminate all oil leakage and feed oil to the bearing under pressure so as to operate for long periods of time without replenishing the lubricant. If the gaskets leak, the lubricant will be exhausted very rapidly with the resulting destruction of the fan, and very often the radiator.

The object of the invention is to construct a fan of this character which will be self-lubricating through the medium of a force feed system, eliminate oil leakage about the gaskets and connections, and maintain a proper quantity of oil supply, as hereinafter will be more fully set forth and described.

One feature of the invention resides in the simplified impeller for effecting a force feed of lubricant to the bearing surface. This comprises a single impeller blade rigidly secured to the spindle and provided with a spiral groove formed in the surface thereof decreasing in depth from the periphery to the center for receiving oil from the lubricant chamber and forcing it through the spiral oil grooves formed in said spindle.

It has been observed that the greatest friction or pressure of the bearing is exerted at the rear portion thereof. Thus, it is desirable to effectively lubricate that portion of the bearing in particular. To this end, the feed for the lubricant is so formed as to increase the lubricant pressure over this portion of the bearing by terminating the oil feeding grooves at a distance from the end of the bearing surface to increase the resistance to the flow of the oil and thereby increase the pressure, the increased pressure being more effective in forcing the oil about the bearing surface.

Another feature of the invention resides in the substantial length of the oil deflecting cup surrounding the free end of the hub bearing, said cup being of such length as to retain the same or a greater quantity of oil in the lubricant chamber when the hub is in a vertical position, as is maintained therein when in horizontal position by the standpipe of the filling opening, while at the same time acting as a deflecting member throwing the oil forwardly as it passes from the free end of the bearing sleeve.

A further feature of the invention resides in the reinforcing plate secured to the open end of the hub adjacent the spider plate of the fan which is adapted to brace and hold tight the gasket which is commonly placed between the fan spider and hub. By inserting this plate, the vibration transmitted from the blades rotating at high speed to the spider center plate will not loosen the gasket and thereby induce oil leakage.

Another feature of the invention resides in the construction of the sealing surfaces and the members for holding the sealing surfaces and gaskets in position to prevent any possible leakage regardless of the oil pressure due to centrifugal force, the strain, torque and vibration under which the fan is driven at very high speeds.

From the foregoing, it will be noted that the several features of this invention relate principally to the preservation of the oil supply under exacting operating conditions throughout an indefinite period of use.

The full nature of the invention will be understood from the accompanying drawing and the following description and claims:

Fig. 1 is a central vertical section through the fan pump. Fig. 2 is a plan view of the fan pump. Fig. 3 is a section taken on the line 3—3 of Fig. 2. Fig. 4 is an enlarged section of a portion of the head plate showing the connection thereof with the shell and the spacer plate. Fig. 5 is a section taken on the line 5—5 of Fig. 1. Fig. 6 is a perspective view of one of the double nuts.

In the drawing there is illustrated a fan structure mounted upon a stationary spindle 10. Said structure comprises a hub casing 11 surrounding a bearing sleeve 12 rotatably mounted upon said spindle. The rear end of the casing 11 is formed with an inwardly turned portion 13 having a suitable central opening through which the spindle extends, there being secured within said opening and surrounding the spindle a substantially conically-shaped deflector cup 14. The rear end of the bearing sleeve 12 terminates short of the rear end of the casing indicated at 13, but the deflector 14 extends substantially forward thereof, terminating about the central portion of the lubricant chamber 15 defined by the bearing sleeve 12 and the casing 11. The bearing sleeve 12 is preferably formed of a casting terminating at the forward end thereof in a head plate 16 extending rearwardly from the bearing sleeve beyond the periphery of the casing 11. Formed in the front surface of the plate 16 there is a recess 17 in which an oil feed propeller 18 is positioned, said impeller being rigidly secured to the forward end of the spindle 10 so as to remain stationary therewith.

Secured to the forwardly-extending surface of the plate 16 and spanning the recess 17 formed therein, there is an end thrust bearing plate 19 formed with an outwardly-extending bulge 20 and a rearwardly-extending peripheral flange 21. The fan blades 22 are secured to a central spider plate 23 which is provided with a central bulging portion 24 complementary to the bulge 20 adapted to accommodate the bolt head on the end of the spindle. A pulley 25 is secured to the outer periphery of the casing 11 in the usual manner.

A quantity of oil is maintained in the oil reservoir indicated at 15, the oil being introduced through the opening in a standpipe 26 which extends radialy inward from the periphery of the casing 11 toward the bearing sleeve 12, the depth of the standpipe surrounding the oil filling hole being the desired depth of lubricant to be maintained in the reservoir. The oil filling opening in the standpipe is closed by a screw plug 27.

The spindle is provided with a spiral oil groove 28 formed in the surface thereof through which oil is adapted to be forced by the impeller blade 18. The hub of the fan rotates rapidly with respect to the impeller blade which remains stationary with the spindle. Therefore, there is an extremely high speed of relative rotation between the impeller blade and hub. Said blade is provided with a forward projecting mouth 29 having a deep groove 30 formed on each side thereof, said groove curving toward and communicating with a center groove 31, the center groove 31 on one side of the impeller communicating with the front end of the spiral oil groove 28. The groove 30 decreases in both depth and width toward the center for increasing the pressure on the oil contained therein, whereby it will be delivered to the spiral oil grooves under such pressure as to cause a continuous flow therethrough. The oil is forced into the recess 17 by the pressure thereon resulting from centrifugal force, through the several ports 32 communicating with the periphery of the oil reservoir 15. The impeller picks up the oil thus forced into the recess 17, whereupon it is forced through grooves 30 and 31 under increased pressure on the one side of the impeller to the spiral oil groove 28, and on the other side thereof presents an oil film which at times receives the end thrust of the hub with respect to the spindle.

The plate 19 with the spider and fan blades is secured to the front side of the enlarged head 16, while the casing 11 of the hub is rigidly secured to the rear side thereof. It is most important that these connections be well and permanently sealed against oil leakage. To that end, the front and rear surfaces of the enlarged head 16 are each provided with protruding annular surfaces 33 against which the angular gaskets 34 are mounted and compressed by the clamping bars or double nuts 35. Said clamping bars comprise arcuate members of a curvature concentric with the head 16 and are provided with one or more screw threaded holes coinciding with the holes through the enlarged head for receiving the clamping bolts. Said clamping bars are adapted to span an appreciable space with their ends abutting so as to provide a rigid clamp throughout the entire annular surface of the gasket. Thus, said bars act both as a rigid annular clamping member and securing nuts for the bolts, while at the same time being individual segments, more readily conform to the surface than would a continuous rigid ring. Through this medium, the structures are held firmly together in sealed relation so that there will be no opportunity of buckling of the metal between the bolts when they are tightened, which often results in oil leakage.

The protruding surfaces 33 are provided for the purpose of reducing the effective surface against which the gaskets are clamped, and thereby increasing the unit pressure upon tightening of the bolts. Thus, the usual "take-up" of the gaskets is eliminated, since the maximum unit pressure permits of complete initial compression of the gaskets. When the bolts are once tightened, no further "take-up" is necessary and the unit pressure is so great that a more efficient and complete sealing against oil leakage than heretofore is to be obtained.

For the purpose of more effectively spreading the oil over the rear portion of the bearing surface, the spiral oil groove 28 is terminated at a distance from the rear end of the bearing sleeve 12, as best shown in Fig. 1. Thus, when the oil forced through the spiral oil groove 28 reaches the end thereof, its only escape is to spread out over the bearing surface of the spindle 10 and bearing sleeve 12, as distinguished from freely passing back into the reservoir through a groove or the like. Thus, the termination of the spiral oil groove sets up a resistance to the flow of oil which creates a substantial pressure under which the oil is forced over this portion of the bearing surface to more effectively lubricate the same.

The invention claimed is:

1. The combination with a stationary spindle, of a fan hub mounted for rotation thereon including a bearing sleeve, a casing secured thereabout for providing an oil reservoir, a head on said bearing sleeve formed with an annular recess therein communicating with said oil reservoir, a plate secured over said head for enclosing said recess, and an oil feeding member fixed to the end of said spindle and lying in said recess, said member being of substantially the same thickness as the depth of said recess and provided with a radial enlargement thereon having a forward face, said face being connected to the central portion of said member by a substantially spiral groove formed on each side thereof, each of said grooves decreasing in cross sectional area toward the central portion whereby oil will be passed into said grooves and forced thereby to the bearing surface of the spindle and to the forward face of said member.

2. The combination with a stationary spindle, of a fan hub mounted for rotation thereon including a bearing sleeve, a casing secured thereabout for providing an oil reservoir, a head on said bearing sleeve formed with an annular recess therein communicating with said oil reservoir, a plate secured over said head for enclosing said recess, and an oil feeding member fixed to the end of said spindle and lying in said recess, said member being of substantially the same thickness as the depth of said recess and provided with a radial enlargement thereon having a concave forward face, a groove formed on each side of said member about the center thereof, and a substantially spiral groove connecting said concave face with the central grooves on each side of said member, each of said spiral grooves decreasing in cross sectional area toward the central groove, whereby oil will be passed into said spiral grooves and forced thereby to the central grooves to be conducted to the bearing surface of said spindle and the forward face of said member.

3. The combination with a stationary spindle, of a fan hub mounted for rotation thereon, said hub including an inner bearing sleeve mounted to rotate on said spindle, a head member formed upon one end of said bearing sleeve, a casing surrounding said sleeve and spaced therefrom to provide an oil chamber and having an outwardly extending flange member adapted to be secured to the head of said sleeve, said head member being provided with an annular protruding reduced surface in the abutting face thereof, a gasket surrounding the same, and a plurality of segmental plates for clamping said members in sealing engagement against pressure of the oil due to centrifugal action, and preventing buckling thereof.

4. The combination with a stationary spindle, of a fan hub mounted for rotation thereon, said hub including an inner bearing sleeve mounted to rotate on said spindle, a head member formed upon one end of said bearing sleeve, a casing surrounding said sleeve and spaced therefrom to provide an oil chamber and having an outwardly extending flange member adapted to be secured to the head of said sleeve, said head member being provided with a protruding reduced surface in the abutting face thereof, a gasket mounted thereover, a plurality of segmental plates curved in cross section and having their concave faces abutting one of said members, and a plurality of bolts adapted to secure said plates to the other member for directly clamping said members together over a substantial area of their abutting faces to prevent buckling and effecting a permanent seal against oil pressure due to centrifugal action.

5. The combination with a stationary spindle, of a fan hub mounted for rotation thereon including a bearing sleeve, a casing secured thereabout for providing an oil reservoir, a head on said bearing sleeve, a plate secured over said head and spaced from the central portion thereof for providing a chamber therebetween, an oil feeding member fixed to the end of said spindle and lying in said chamber provided with a radially extending enlargement thereon, a concave forward face formed on said enlargement, and substantially spiral grooves formed in both surfaces of said member and extending from said concave forward face spirally toward and about the center thereof for conducting oil gathered and directed therein by said concave forward face, to the bearing surface of said spindle and the forward face of said member.

6. The combination with a stationary spindle, of a fan hub mounted for rotation thereon, said hub including an inner bearing sleeve mounted to rotate on said spindle, a head member formed upon one end of said bearing sleeve, a casing surrounding said sleeve and spaced therefrom to provide an oil chamber and having a flange member adapted to be secured to the head of said sleeve, and a plurality of segmental plates for clamping said members in sealing engagement against pressure of the oil due to centrifugal action for preventing buckling thereof.

LOUIS SCHWITZER.